May 19, 1970  E. LAIMINS  3,512,595
SUSPENSION-TYPE STRAIN GAGE TRANSDUDER STRUCTURE
Filed Sept. 27, 1967  3 Sheets-Sheet 1

INVENTOR.
ERIC LAIMINS
BY
Thomson & Mrose
ATTORNEYS

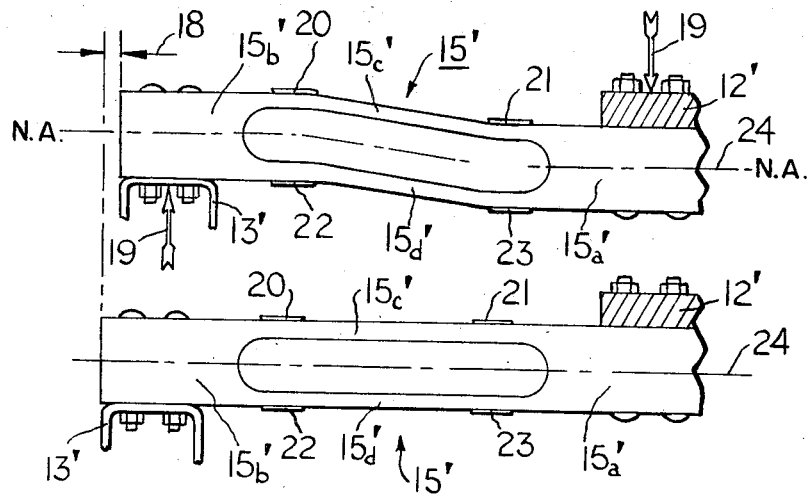
FIG. 3
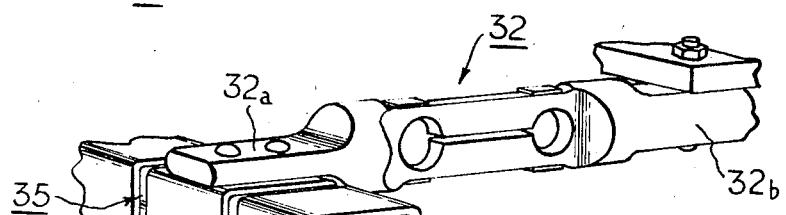
FIG. 5
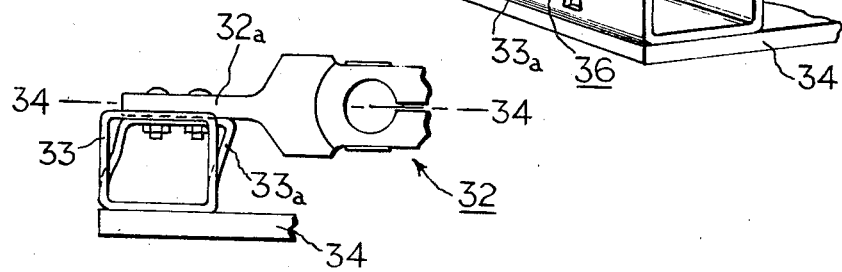
FIG. 4
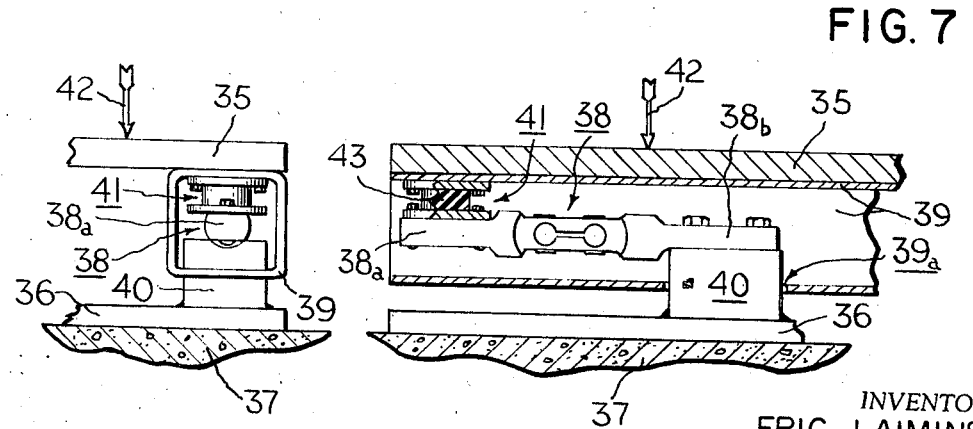
FIG. 7
FIG. 6
INVENTOR.
ERIC LAIMINS
BY
Thomson & Mrose
ATTORNEYS May 19, 1970     E. LAIMINS     3,512,595
SUSPENSION-TYPE STRAIN GAGE TRANSDUCER STRUCTURE
Filed Sept. 27, 1967
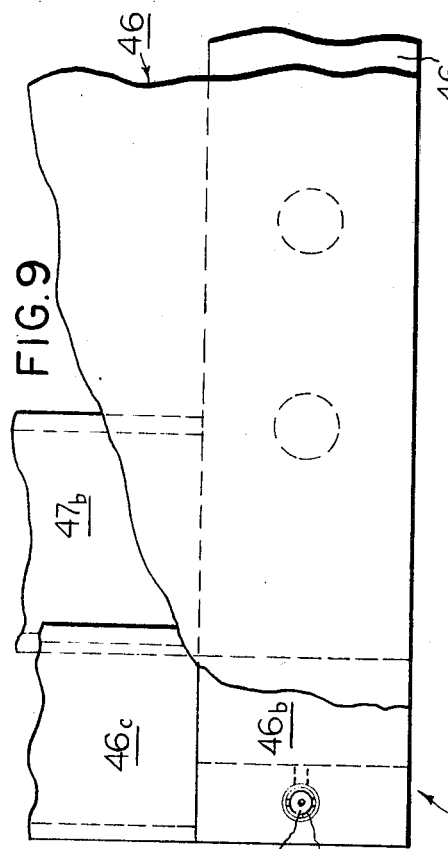
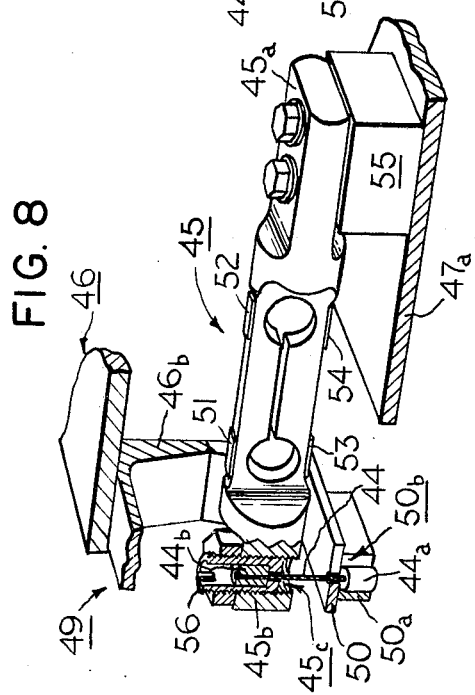
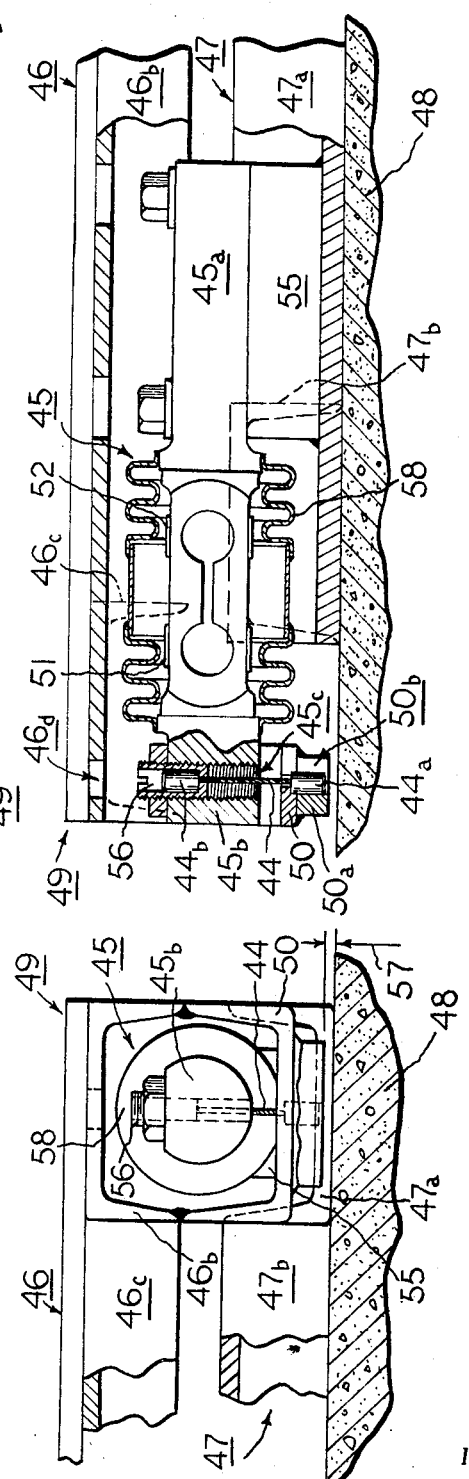
INVENTOR.
ERIC LAIMINS
BY
Thomson & Mrose
ATTORNEYS United States Patent Office 3,512,595
Patented May 19, 1970

3,512,595
SUSPENSION-TYPE STRAIN GAGE
TRANSDUCER STRUCTURE
Eric Laimins, Belmont, Mass., assignor to BLH Electronics, Inc., Waltham, Mass., a corporation of Delaware
Filed Sept. 27, 1967, Ser. No. 670,945
Int. Cl. G01g 21/10
U.S. Cl. 177—187                                13 Claims

ABSTRACT OF THE DISCLOSURE

A substantially rigid broad-area platform to which loading is applied for precision weighing purposes is stably suspended in relation to its supports wholly by way of a plurality of cooperating beam-type electrical strain gage transducer elements having flexural end connections which uniquely isolate the transducer elements from forces other than those of the intended measurements and promote exceptionally linear transducer characteristics which lead to improved weighing accuracy despite variations in operating conditions.

BACKGROUND OF THE INVENTION

The present invention relates to improvements in the precision measurement of forces by way of a plurality of cooperating gaged structural elements which stably suspend a load-receiving structure in relation to supporting structure through linearizing and isolating flexures, and, in one particular aspect, to novel and improved beam-type platform weighing scales of inexpensive, compact, low-profile construction wherein a plurality of parallelogram-type cantilever beam elements equipped with strain gages suspend a rigid platform in relation to a support at spaced positions promoting stability, the beams each being mechanically in series with unique flexures which substantially isolate the beams from error-inducing external forces and which counteract tendencies of the beams to develop linearity errors such as would otherwise prevent precise measurements via the beams in combination when, inevitably, the locations and distributions of loading forces vary.

Electrical strain gages have now long been used to provide measurements related to the elastic strains resulting from loading-induced stresses of elements such as beams, columns, diaphragms, and the like. The wire, foil and semiconductor type gages have gained widespread acceptance for use in transducer devices wherein they may be bonded to small surface areas of deformable elements which are subjected to loading, and wherein that loading is then measured in terms of the related changes in electrical characteristics of the gages. Commonly, such transducers are self-contained devices, the designs of which permit them to satisfy the needs of a variety of installations. However, such transducers tend to be accurately responsive only when the applied loading is aligned with a predetermined axis, and, hence, in small-size units, auxiliary diaphragms are often employed to suppress unwanted lateral deflections of the deformable elements. In larger assemblies, such as those of massive weighing platforms, the potentially troublesome side forces may be resisted by strong but somewhat elastic auxiliary stay rods. Both of such auxiliary guides effectively parallel the gaged deformable elements of the transducers, with the results that the intended measurements are necessarily influenced by the characteristics of these guides, and any erratic or non-linear behavior of the guides is in turn reflected adversely in the measurement accuracy and linearity of the transducer. To a great extent, difficulties of the aforesaid character may be avoided in certain applications by mounting a load-carrying structure, such as a weighing platform, upon a support directly by way of at least two spaced parallelogram-type cantilever-beam transducer elements which are stiff enough to withstand the weighing loads and which insure that the permitted deflections of the load-carrying structure can only be minute and substantially linear. A further key to optimum performance and usefulness of such equipment is found in yet greater improvement of the linearity of the output vs. loading characteristics of the transducer elements in their weighing-equipment environment; if this improvement is realized, then the combined outputs taken as a measurement of the loading will be highly precise irrespective of the manner in which these elements happen to share any given load, i.e., irrespective of where the load is located on the platform. Moreover, the transducer elements obviously should be rendered highly immune to dimensional changes, with temperature, loading, etc., of the associated platform and support structures, and their possible interplay with one another should be eliminated, if measurement accuracy, stability and reliability are to be achieved. It should be possible, also, for this type of equipment to be fabricated in lightweight uncomplicated form and to be installed inexpensively and operated with outstanding precision by relatively unskilled personnel if it is to earn acceptance as a replacement for the well-regarded conventional types of scales which are generally mechanical in nature.

SUMMARY

By way of a summary account of underlying recognitions and of preferred practice of this invention in one of its aspects, an advantageous platform-type scale of low-profile lightweight construction having stable accurate weight-indicating capabilities is realized through suspension of a load-carrying platform structure relative to a support structure by way of at least three spaced parallelogram-type cantilever-beam transducer elements each equipped with strain gage sensors, the beam elements each having one end rigidly secured to one of the structures and each having its opposite end coupled with the other of the two structures through a special form of flexure unit. Each of the flexure units is characterized by the ability to yield somewhat in directions of small axial shifts of position of the associated end of the cooperating beam element under different deflection conditions, while nevertheless transmitting its intended full share of the platform loading in the intended direction. In one example, the beam elements are horizontal and the flexure units each include a multi-wire rope or cable disposed so that it is maintained in tension for load-transmitting purposes, and so that limited relative lateral movements can take place between the free ends of the beam elements and one of the support or platform structures. Membrane forces which tend to occasion troublesome non-linearities in strain gage outputs from the beam elements are avoided because the wire flexures do not impose appreciable restraints along the neutral axes of the beam elements. Importantly, warpage and other dimensional changes, particularly of the support structure, are readily accommodated by the flexure units without being reflected in the measurements, and, in addition, the flexure units lend themselves to height-wise levelling adjustments of the weighing platform without occasioning errors.

Accordingly, it is one of the objects of the present invention to provide novel and improved force-responsive structure wherein a plurality of strain gage transducer elements which cooperatively suspend a force-receiving structure and contribute to measurements are uniquely isolated from certain nonlinearity-inducing effects and rendered highly precise by flexible couplings.

Another object is to provide accurate and stable platform-type electrical weighing apparatus wherein deleterious actions of membrane forces in gaged transducers suspending the platform are avoided through associations with flexible couplings.

Further, it is an object to provide high-precision low-profile weighing apparatus in which unique cooperations between transducer elements and flexural couplings prevent errors due to dimensional changes and linearity variations, and which may be readily and inexpensively installed and adjusted for weighing.

It is yet another object to provide improved platform scales wherein a plurality of parallelogram-type beam elements carrying strain gages suspend platforms by way of wires, shock mounts or other flexures which transmit vertical loading while accommodating lateral displacements to isolate the beam elements from forces which would otherwise tend to induce measurement errors.

Although the features of this invention which are considered to be novel are set forth in the appended claims, further details as to preferred practices and as to the further objects and advantages thereof may be most readily comprehended through reference to the following description taken in connection with the accompanying drawings.

BRIEF DESCRIPTION OF THE DRAWINGS

FIG. 3 illustrates a parallelogram-type cantilever transducer, associated with weighing platform structure, under both loaded and unloaded conditions;

FIG. 4 portrays a fragment of a weighing-scale structure including a parallelogram-type structural transducer having a flexural connection through a slotted box-beam support element;

FIG. 5 presents a side view of the structure of FIG. 4 undergoing loading and experiencing a flexure deformation which is exaggerated for purposes of clarity;

FIG. 6 is an end view of a corner of a weighing assembly wherein a structural transducer housed within a box beam element is provided with a shock-absorbed type flexural connection;

FIG. 7 views the assembly of FIG. 6 from the side, with portions being sectional to reveal details of construction;

FIG. 8 depicts a parallelogram-type cantilever beam and adjustable wire rope flexure interposed as a support structure between relatively movable parts of a platform weighing assembly, certain portion being broken away to expose details of construction;

FIG. 9 is a plan view of a corner fragment of a platform weighing assembly including support structures such as that of FIG. 8;

FIG. 10 provides a partly-sectioned side view of the assembly of FIG. 9; and

FIG. 11 is a partly-sectioned end view of the assembly of FIG. 10.

DESCRIPTION OF THE PREFERRED EMBODIMENTS

Figure 1:
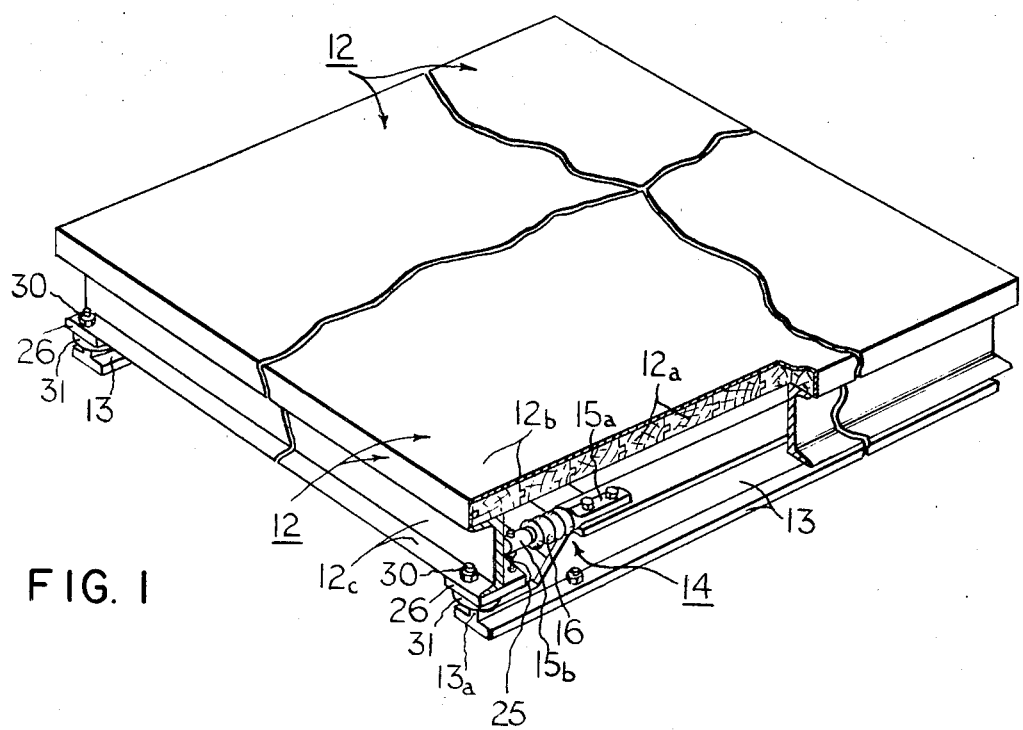
FIG. 1 is a perspective view of an improved platform-type weighing system, with portions broken away to reduce the overall expanse in illustration and to expose a corner-located transducer support and its associated flexure cable.
Figure 2:
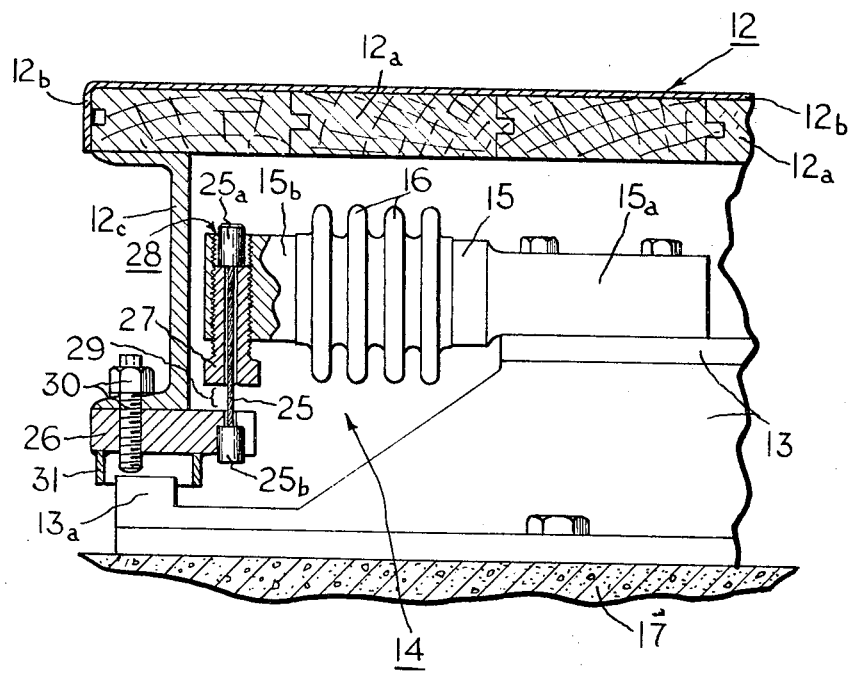
FIG. 2 provides an enlarged side view, partly in section, of the transducer support and portions of the connected platform structure appearing in FIG. 1.

The weighing apparatus illustrated in FIG. 1 is of a low-height, or so-called "low profile," design which lends itself particularly well to simple installation and operation atop a foundation flooring or the like, although it may be mounted otherwise and, in particular, may be readily recessed into a flush relation with other surfaces where that is desirable. Its load-carrying upper platform structure 12 is preferably rigid and capable of withstanding severe localized loadings without extensive temporary deformation or permanent distortion, and, as shown, is in the convenient form of a lightweight unitized assembly of hardwood planks $12_a$ joined with a metal plate $12_b$ and including stiffening supports underneath. Not all of the latter are exposed to view in the drawing, but four of these, $12_c$, are edge-located channel beams fixed in a downwardly-depending relationship. The aforesaid relatively lightweight but rigid load-carrying platform is suspended in relation to interconnected underlying framework members 13, shown in the convenient structural form of I-beams, at each of its corners, wholly by way of a structural transducer array such as that designated by reference character 14. As is better shown in FIG. 2, each such array includes a relatively stiff but somewhat deformable cantilever-beam type member 15, fixely secured at one end $15_a$ to the top of a framework beam 13, and extending horizontally with its relatively free end $15_b$ disposed for at least limited vertical deflections and for interconnection with the platform structure. Conventional electrical strain gages bonded to surfaces of the member 15 at known prescribed sites intermediate the beam ends provide the means for measuring the loadings being experienced; such gaging is preferably protectively shrouded by a highly flexible closure such as the relatively limp bellows unit 16.

Stiff framework members 13 are designed to be rested upon and/or secured to a suitable foundation 17, and any initial surface irregularities or subsequent distortions of the foundation will of course tend to warp or otherwise deform the framework and alter its relation to the platform mounted upon it. Similarly, the framework itself, despite the strength of secure interconnections between its members 13, is subject to load- and temperature-induced deformations and dimensional changes. If the deflectable ends, such as $15_b$, of the transducer-support beams are rigidly secured to the platform structure, as has been a practice known heretofore, then transient and static dimensional excursions in the platform, the underlying framework, and the underlying foundation, can affect the transducer beams and lead to erroneous indications via the strain gaging. To some extent, difficulties from such sources can be reduced by utilizing transducers which tend to be insensitive to forces other than those effective in the vertical weighing direction, and by absorbing the costs and other complications of preparing a foundation carefully, and by having recourse to more massive platform and support framework structures. The improvements which could be realized have nevertheless been limited because of the peculiar circumstances, associated with platform-scale apparatus, that each of the several transducer-supports makes an essentially independent weight measurements at a different location and that these measurements must be combined to provide a truly precise measurement of the total weight which is applied. Accordingly, any non-linearities in the weight vs. output characteristics of any or all of the transducers can adversely affect the measurements, it being self-evident, for example, that any such non-linearity will occasion different outputs when the same loading is merely distributed differently among the cooperating transducers. Linearity characteristics of cantilever beam transducers are found to be significantly affected by results of certain stresses which attend the beam deflections but are not accurately reflected in the strain-gage outputs as proper representations of the loading under measurement. So-called "membrane" or "fiber" stresses are of such character, and occur when the natural foreshortening tendencies of a deflected beam are resisted by way of the mechanical connections with the deflected beam end, as characterized in an exaggerated manner in FIG. 3. There, a parallelogram-type cantilever beam element 15', firmly connected between a loading-platform member 12' and a support framework member 13', is shown to have its deflected end $15_b'$ effectively drawn inwardly by an amount 18 when the unloaded beam illustrated in the lower part of FIG. 3 is heavily loaded by forces designated by arrows 19 in the upper portion of FIG. 3. The parallelogram construction illustrated for beam 15' is one including a pair of relatively deformable elastic intermediate portions $15_c'$ and $15_d'$ joined integrally with the relatively inflexible ends $15_a'$ and $15_b'$; electrical-resistance strain gages 20 and 21 along top surfaces at flexure sites, and gages 22 and 23 along bottom surfaces at the flexure sites, respond to surface strains of the beam and are electrically interconnected in a known bridge relationship (not illustrated) which renders the output measurements generally indicative of the loading being experienced. Typically, gages 20 and 21 will undergo tension and compression, respectively, while gages 22 and 23 simultaneously undergo compression and tension, respectively, during the loading portrayed in FIG. 3, and, when these gages are connected into a typical Wheatstone bridge array with gages 20 and 23 in opposite diagonals and gages 21 and 22 in the other opposite diagonals, the resulting measurements are theoretically linearly related to the loading.

One of the advantages realized in use of the described parallelogram-type beam is that its deflected end tends to remain substantially horizontal, as shown in FIG. 3, with the neutral axis (N.A.) 24 being curved in the intermediate positions under loading; this avoids twisting and tilting effects and insures that the platform deflections are essentially in the vertical direction only, and, although certain related membrane or fiber stresses must appear at the gage sites, they are of senses which permit the bridge interconnections to effect desirable mutual cancellations. However, there is not such a mutual cancellation of the membrane or fiber stresses, and the like, resulting from the foreshortening tendency, characterized by dimension 18 in FIG. 3, and opposed by the members 12' and 13'. The latter members in a weighing assembly normally must be connected with others in such a manner that their horizontal relationships are essentially fixed, and the deflected beams are therefore subjected to what may be described generally as stretching effects. Moreover, the aforementioned dimensional variations, due to temperature and loading effects experienced by the platform and the support framework and the foundation, and irregularities of the foundation mounting surface, can likewise occasion troublesome stretching, twisting or buckling tendencies in the transducer beams. Linearity errors from such sources can so disrupt overall measurement accuracy as to defeat widespread adoption and use of such weighing equipment, and criticality of installation and adjustment, as well as need for specially-prepared foundations, can likewise militate against ready commercial acceptance of the electrical platform-type weighing equipment. It is in connection with such difficulties that the apparatus of FIGS. 1 and 2 utilizes a flexible high-tensile-strength wire rope or cable, 25, as a wholly independent section of structural interconnection between the weighing platform 12 and its underlying support, the cable normally being maintained in tension between the deflectable end $15_b$ of the transducer beam and a bracket 26 below it extending from beneath the downwardly-extending channel beam $12_c$ of the platform 12. Heightwise adjustments of the platform are important for purposes of levelling when, as is usually the case, the foundation is not perfectly flat and horizontal, and although the actual cable length is preferably fixed between its integral enlarged end members $25_a$ and $25_b$, the effective length, and, hence, height of the platform at the associated corner, may be conveniently set by adjusting the threaded hollow bolt 27 which is mated with an internally-threaded vertical opening 28 in the beam end $15_b$. Lower cable end $25_b$ is trapped within a recess in the bracket 26, and upper cable end $25_a$ is trapped within the beam opening 28 at a height determined by the adjustment of cooperating bolt 27. The longitudinal bore through the bolt is of a sufficiently greater diameter than that of the cable that the resulting clearance will permit the cable to deflect from the vertical by amounts needed to accommodate the aforementioned transducer deflections, and the dimensional variations in the weighing structure and foundation, without binding. Preferably, only a relatively short length of the cable, 29, is free of close lateral confinement by the nearby structure, such that this length may develop a desirable stiffness and damping effects if the platform is transiently deflected excessively. Further, an adjustable vertical-stop bolt unit, 30, extending from member $12_c$ toward member 13, limits the permissible downward deflection of the platform under excessive loading and limits play during shipment and installation, and a lateral stopping arrangement is provided by an upwardly-extending end projection $13_a$ from framework member 13 nested loosely within a surrounding cup-like stop member 31 fixed to the bottom of the platform member $12_c$. It will be understood, of course, that at least three transducer-beams with associated wire cables are needed to suspend a platform, and that the arrangement of FIG. 1 includes four such units, one at each corner; in normal use, the load-carrying platform is thus suspended at a plurality of points only by the tensioned wire elements. These flexible wire elements may be permitted to deflect slightly out of line with the true vertical, for any of the reasons mentioned hereinabove, without imposing significant loading on the associated transducers in undesirable lateral directions; forces in such lateral directions are necessarily minute in relation to the vertical loading forces under measurement, because they are proportional to the extremely small sine value of the permissible small deflection angles. In turn, the inherent transducer capabilities of providing electrical gage outputs linearly related to loading in the vertical direction, over a predetermined relatively large range, are retained and thus enable the combined transducer outputs to remain precisely related to the total loading, irrespective of load locations or distributions upon the weighing platform.

Beneficial results are also obtainable through use of a weighing-platform flexure arrangement such as that depicted in FIGS. 4 and 5. There, a gaged parallelogram-type cantilever-beam 32, which is at least functionally like the above-described beam 15, has one end, $32_b$, fixed with a structural member 33 of the load-carrying platform (not shown) and its opposite end, $32_a$, fixed with a flexible section, $33_a$, of a box-beam framework member 33 mounted upon a foundation support 34. A plurality of such assemblies makes up the completed weighing-platform and support ensemble. Although the box-beam framework member 33 is itself, and through interconnections with other framework members, a substantially rigid member, and tends to develop the undesirable transducer stretching actions referred to in relation to member 13' in FIG. 3, a compensatory flexibility in directions parallel with the transducer-beam longitudinal axis 34—34 is realized through transverse slotting, 35 and 36, on each side of the beam connection, to form the flexure section $33_a$ as shown in FIG. 4. Under severe loading, the linearity-disturbing foreshortenings of beam 32 are not suppressed but instead are accommodated by lateral deflections of the slot-isolated section, $33_a$, in the manner illustrated in FIG. 5, wherein the lateral displacements and deflections of section $33_a$ are exaggerated in the interests of drawing clarity. The flexure section, of high-strength but nonetheless elastic metal, retains structural strength needed to sustain the applied loadings under measurement, and the very small lateral deflections required of that section do not occasion buckling, collapse or other permanent deformations. The depth of slotting, and slot spacings, can be selected to regulate the flexibility. In the flexure version shown, there is a relatively high degree of stiffness in the direction of elongation of member 33, and the directions of such stiffness of a plurality of such flexures may be differently arrayed in an overall weighing-platform combination to produce a stable platform suspension which both resists lateral displacements and yet accomodates transducer foreshortenings to promote linearities and weighing precision.

The platform scale arrangement appearing in FIGS. 6 and 7 likewise incorporates a load-carrying platform 35 suspended in relation to a support framework 36 and foundation 37 by way of a plurality of parallelogram-type cantilever-beam transducer units such as the unit 38. The latter corresponds to transducer-beam 32 in FIG. 4, and, functionally, the beam behavior is generally like that for beam 15' in FIG. 3. Construction is improved by separating the parallel upper and lower beam elements by way of a horizontal slot merged at its ends with enlarged transverse circular openings which localize the sites of flexure and gaging, all as shown and as is well known in the art. A compact, lightweight, high-strength and protected weighing structure is furthered by housing the gaged transducer-beam 38 within the hollow box-beam member 39 which is fixed with and part of the platform 35. An opening $39_a$ through the bottom wall of member 39 freely admits a mounting bracket 40 secured to support framework 36, and one end, $38_b$, of the transducer-beam 38 is mounted upon that bracket in a substantially horizontal position. The opposite end, $38_a$, of the same transducer-beam is coupled with the platform 35 by way of a shock-absorbing flexure unit 41 exhibiting both good lateral flexibility and vibration-damping characteristics while yet functioning well, in compression, to deliver platform loading forces (arrow 42) to the transducer-beam 38. In its illustrated form, shock-absorbing flexure unit 41 includes a molded rubber pad 43 bonded with and sandwiched between upper and lower metal mounting plates secured respectively to the deflectable end of the transducer-beam and the upper interior of the surrounding box beam 39. Vibrational energy tends to be isolated and dissipated rapidly by such a flexure unit, without involving the appendabe of separate shock absorbers and vibration isolators. The molded-rubber flexure unit may of course be made in a variety of forms wherein the rubber or other elastic material is disposed between and provides the coupling between stiff parts which are relatively movable in the desired lateral direction or directions; the principal load-transmitting strength of such units is generally realized when the elastomer is under compression, and thus that is the preferred arrangement. Linearity improvements and other advantages are produced on the basis of principles already discussed hereinabove.

FIGS. 8 through 11 illustrate features of construction of an improved 500-lb. capacity platform scale of low profile utilizing tensioned wire-rope or cable, 44, in each transducer-support unit, such as unit 45, between a load-carrying platform structure 46 and its underlying support framework 47. The latter framework, made up principally of relatively light channel beams such as $47_a$ and $47_b$, may be rested upon, secured atop, or recessed into a suitable foundation 48, without undue regard for minor initial departures from level or for the possibilities of subsequent dimensional variations in the foundation or framework with temperature, loading, and the like. Removable platform cover plate $46_a$ is carried upon lightweight platform framework made up of channel beams such as $46_b$ and $46_c$. Corner 49 of the assembly is typical of each of the four corners and, there, the lower support framework member $47_a$ ends short of the corner to accommodate a downwardly-depending U-shaped yoke 50 the ends of which are welded to the platform framework member $46_b$. Loading of the platform causes wire suspension element 44 to be tensioned between the yoke 50 and the deflectable end $45_b$ of the transducer-beam unit 45, and, in turn, the transducer-beam is elastically deformed such that its associated electrical-resistance strain gages 51 through 54 will, together in a Wheatstone bridge network, characterize the loading. This transducer-beam is fashioned and gaged in the manner of beam 32 and 38, and its gages are preferably interconnected as discussed hereinabove in relation to those beams and beam 15'. A mounting bracket 55 fixedly supports beam end $45_a$, such that the transducer-beam is disposed substantially horizontally, with its deflectable end $45_b$ conveniently nested within the open yoke 50, as illustrated. Short wire element 44 has its ends securely fixed with cylindrical holding members $44_a$ and $44_b$ of somewhat larger diameter, and these are respectively trapped and held by the yoke 50 and beam end $45_b$. Tapped vertical opening $45_c$ in beam end $45_b$ received an externally-threaded hollow adjustable holder 56 for wire member $44_b$, and its rotation via a suitable tool inserted into its slotted upper end through opening $46_d$ permits the wire connection with the transducer-beam to be adjusted in the vertical direction, particularly for purposes of levelling during installation of the scale. Wire holding member $44_a$ is trapped within an opening in yoke 50 and its bracket $50_a$, both of which are narrowly slotted laterally, as designated by reference character $50_b$, to facilitate assembly. The yoke structure need have only a slight clearance, 57, in relation to the foundation or other underlying support structure, such that vertical stopping will be realized in the event of overloading. A highly pliant bellows arrangement 58 provides sealing of the gaged portion of the transducer-beam without affecting its responses to loading.

Platform scales constructed in accordance with the present teachings may include the flexure and transducer-beam suspension arrangements in various arrays other than that wherein they are at corners of a rectangular platform; by way of example, they may be in a triangular configuration, or a plurality of these suspensions may be arranged radially. Double-ended transducer-beams, having opposite gaged ends provided with sepaarte flexures and which are deflectable in relation to a rigid mid-portion, may also be employed advantageously. Although electrical-resistance type strain gages have been referred to, their functions may instead be discharged by gages operating differently. The wire-type coupling elements may in some instances include a single high-strength strand, rather than a braid of numerous strands; however, the latter helpfully aid in the frictional dissipation of vibrational energy. Mechanical and shock-absorber type flexures which will functionally duplicate the characteristics of those currently-preferred couplings specifically illustrated and described may also be produced in other forms. Nor is its always necessary that all of the transducer-beams, or structural transducers, which make up a platform suspension be equipped with the yieldable mechanical couplings or flexures; some of these cantilever-beam units may be rigidly secured to the associated structure at both of their ends, while at least one other unit includes a flexure or like coupling laterally yieldable in those directions wherein dimensional variations would tend to induce the errors resulting from unwanted longitudinal forces on the beam units. Accordingly, it should be understood that the embodiments and practices herein described have been presented by way of disclosure rather than limitation, and that various modifications, combinations and substitutions may be effected by those skilled in the art without departture in spirit or scope from this invention in its broader aspects.

What I claim as new and desire to secure by Letters Patent of the United States is:

1. Electrical load-measuring apparatus comprising a load-receiving structure including a substantially planar platform of substantially rectangular outline, a plurality of structural transducer means each for providing a substantially independent mechanical suspension for said load-receiving structure in relation to a support at a different position, each of said transducer means including a cantilever beam of material having a relatively high modulus of elasticity equipped with electrical strain gage means responsive to stresses which characterize forces deflecting one end of said beam relative to the other, first means for mounting one end of each of said beams in relation to a support, and second means for mounting the other end of each of said beams in relation to said platform substantially at a different corner thereof, said first and second mounting means mounting said cantilever beams substantially horizontally with said platform substantially horizontal and with said cantilever beams between said platform and the support, one of said first and second means for all of said cantilever beams including independently in direct contact and in a series mechanical connection with the associated beam a mechanical coupling which is relatively yieldable in directions substantially parallel with the longitudinl axis of that beam and relatively unyielding in at least one force-transmitting direction substantially normal to said directions, whereby yielding of said coupling in said directions accommodates dimensional variations tending to apply error-inducing forces to said beams in said directions.

2. Electrical load-measuring apparatus comprising a load-receiving structure including a substantially planar platform of substantially rectangular outline, a plurality of structural transducer means each for providing a substantially independent mechanical suspension for said load-receiving structure in relation to a support at a different position, a substantially rigid framework underlying said platform and providing a support structure adapted to be mounted upon the support, each of said transducer means including a cantilever beam of material having a relatively high modulus of elasticity equipped with electrical strain gage means responsive to stresses which characterize forces deflecting one end of said beam relative to the other, first means for mounting one end of each of said beams in relation to a support, and second means mounting the other end of each of said beams in relation to said load-receiving structure, said first and second mounting means mounting said cantilever beams substantially horizontally with said platform substantially horizontal and with said cantilever beams between said platform and the support, said second means mounting the said other end of each of said cantilever beams in relation to said platform substantially at a different corner thereof, said first means mounting said one end of each of said cantilever beams on said framework, said second means for all of said cantilever beams including independently in series with each associated one of the beams a mechanical coupling relatively yieldable at least in directions substantially parallel with the longitudinal axis of that beam and relatively unyielding in at least one force-transmitting direction substantially normal to said directions, each of said couplings including at least one wire, said second means securing said wire substantially vertically with its upper end connected with an end of one of said cantilever beams and with its lower end connected with an underlying portion of said load-receiving structure, whereby yielding of said couplings in said directions accommodates relative dimensional variations tending to apply error-inducing forces to said beams in said directions.

3. Electrical load-measuring apparatus comprising a load-receiving structure including a substantially planar platform of substantially rectangular outline, a plurality of structural transducer means each for providing a substantially independent mechanical suspension for said load-receiving structure in relation to a support at a different position, a substantially rigid framework underlying said platform and providing a support structure adapted to be mounted upon the support, at least one of said structures including hollow beams extending substantially horizontally near the periphery thereof, each of said transducer means including a cantilever beam of material having a relatively high modulus of elasticity equipped with electrical strain gage means responsive to stresses which characterize forces deflecting one end of said beam relative to the other, said cantilever beam elements being nested substantially horizontally with said hollow beams, first means for mounting one end of each of said beams in relation to a support, and second means mounting the other end of each of said beams in relation to said load-receiving structure, said first and second mounting means mounting said cantilever beams substantially horizontally with said platform subsantially horizontal and with said cantilever beams between said platform and the support, said second means mounting the said other end of each of said cantilever beams in relation to said platform substantially at a different corner thereof, said first means mounting said one end of each of said cantilever beams on said framework, one of said first and second mounting means mounting one of the ends of each of said cantilever beams in relation to the associated hollow beam, and the other of said first and second mounting means mounting the other of the ends of each of said cantilever beams in relation to the one of said structures not including said hollow beam, said second means for all of said cantilever beams including independently in series with each associated one of the beams a mechanical coupling relatively yieldable at least in directions substantially parallel with the longitudinal axis of that beam and relatively unyielding in at least one force-transmitting direction substantially normal to said directions, whereby yielding of said couplings in said directions accommodates relative dimensional variations tending to apply error-inducing forces to said beams in said directions.

4. Electrical load-measuring apparatus as set forth in claim 3 wherein said other of said mounting means extends freely through an opening in a wall of said hollow beam.

5. Electrical weighing apparatus comprising a substantially rigid weighing platform structure, a substantially rigid support structure, at least three structural transducer units for providing the sole mechanical mounting for said platform structure in relation to said support structure, each of said transducer units comprising a parallelogram-type cantilever beam arrangement having rigid opposite ends connected by a pair of susbtantially horizontal parallel beam elements and having strain gages of a Wheatstone bridge network secured to surfaces of said beam elements near the ends thereof, means rigidly connecting one of the ends of each of said beam arrangements with one of said structures and thereby mounting said beam arrangements substantially horizontally, and further means yieldably-connecting the other of the ends of each of said beam arrangements with the other of said structures, each of the last-named means comprising means relatively yieldable at least in directions substantially parallel with the longitudinal axis of the associated beam arrangement and relatively unyielding in at least one vertical direction, each of said yieldable means comprising elongated filamentary means of relatively high strength in tension, and each of said further means comprising means securing one end of one of said filamentary means with said other of the ends of one of said beam arrangements and means securing the other end of the same filamentary means with said other of said structures substantially in vertical alignment with said one end of said filamentary means and at a position where weight associated with said platform structure tends to maintain said filamentary means in tension.

6. Electrical weighing apparatus as set forth in claim 5 wherein each of said filamentary means comprises at least one wire, and wherein at least one of said securing means is adjustable to set the vertical position of an end of said filamentary means and, thereby, to affect levelling of said platform structure.

7. Electrical weighing apparatus as set forth in claim 6 wherein each of said adjustable securing means comprises a threaded member connected with an end of one of said filamentary means and threadedly adjustable substantially vertically in relation to said other of the ends of one of said beam arrangements and said other of said structures.

8. Electrical weighing apparatus as set forth in claim 7 wherein each of said other of the ends of said beam arrangements has a substantially vertical threaded opening therein with one of said filamentary means extending through the opening, and wherein each of said threaded members is mated within one of the openings.

9. Electrical weighing apparatus as set forth in claim 8 wherein each of said filamentary means includes enlarged ends, one of which is fixed with one of said threaded members and the other of which is fixed with said other of said structures.

10. Electrical weighing apparatus comprising a substantially rigid weighing platform structure, a substantially rigid support structure, a plurality of structural transducer units for providing the sole mechanical mounting for said platform structure in relation to said support structure, each of said transducer units comprising a parallelogram-type cantilever beam arrangement having rigid opposite ends connected by a pair of substantially horizontal parallel beam elements and having strain gages of a Wheatstone bridge network secured to surfaces of said beam elements near the ends thereof, means rigidly connecting one of the ends of each of said beam arrangements with one of said structures and thereby mounting said beam arrangements substantially horizontally, and further means yieldably connecting the other of the ends of each of said beam arrangements with the other of said structures, each of the last-named means comprising means relatively yieldable at least in directions substantially parallel with the longitudinal axis of the associated beam arrangement and relatively unyielding in at least one vertical direction, each of said yieldable means comprising a body of proportions and material rendering it relatively stiff in one direction and relatively yieldable in directions normal to said one direction between two spaced parts thereof, each of said further means comprising means coupling one of said parts of said body with said other of the ends of one of said beam arrangements and means couplings another of said parts of said body with said other of said structures at a position where weight associated with said platform structure exerts forces between said parts in said one direction, each of said yieldable means comprising a shock absorber unit, said body of each shock absorber unit comprising elastic material, and each shock absorber unit including relatively movable members one of which is connected with said one of said parts and another of which members is connected with said other of said parts.

11. Electrical weighing apparatus as set forth in claim 10 wherein said body comprises a molded rubber mass bonded integrally with said members.

12. Electrical weighing apparatus comprising a substantially rigid weighing platform structure, a substantially rigid support structure, a plurality of structural transducer units for providing the sole mechanical mounting for said platform structure in relation to said support structure, each of said transducer units comprising a parallelogram-type cantilever beam arrangement having rigid opposite ends connected by a pair of substantially horizontal parallel beam elements and having strain gages of a Wheatstone bridge network secured to surfaces of said beam elements near the ends thereof, means rigidly connecting one of the ends of each of said beam arrangements with one of said structures and thereby mounting said beam arrangements substantially horizontally, and further means yieldably connecting the other of the ends of each of said beam arrangements with the other of said structures, each of said last-named means comprising means relatively yieldable at least in directions substantially parallel with the longitudinal axis of the associated beam arrangement and relatively unyielding in at least one vertical direction, each of said last-named means comprising a member of metal having a high modulus of elasticity connecting the said other of the ends of one of said beam arrangements with said other of said structures, the metal of said member between its connections forming a flexure elastically yieldable in said directions substantially parallel with said longitudinal axis of the associated beam arrangement.

13. Electrical weighing apparatus as set forth in claim 12 wherein said member is an integral part of a box beam forming part of one of said structures, three sides of said box beam being interrupted by closely spaced slots between which said member is formed, said box beam being disposed substantially transversely to said axis of the associated cantilever beam arrangement, and the side of said member opposite the unslotted side of said box beam being connected to said other of the ends of the associated cantilever beam arrangement.

References Cited

UNITED STATES PATENTS

| | | | |
|---|---|---|---|
| 2,962,276 | 11/1960 | Thurston | 177—211 X |
| 3,299,976 | 1/1967 | Broadle et al. | 177—134 |
| 3,340,726 | 9/1967 | Armstrong et al. | 73—71.6 X |
| 3,411,361 | 11/1968 | McLellan | 73—141 |

RICHARD B. WILKINSON, Primary Examiner

G. H. MILLER, JR., Assistant Examiner

U.S. Cl. X.R.

73—141; 177—211, 229, 255